Jan. 6, 1942.    H. R. LOUNSBERY    2,269,029
CANE
Filed June 30, 1939
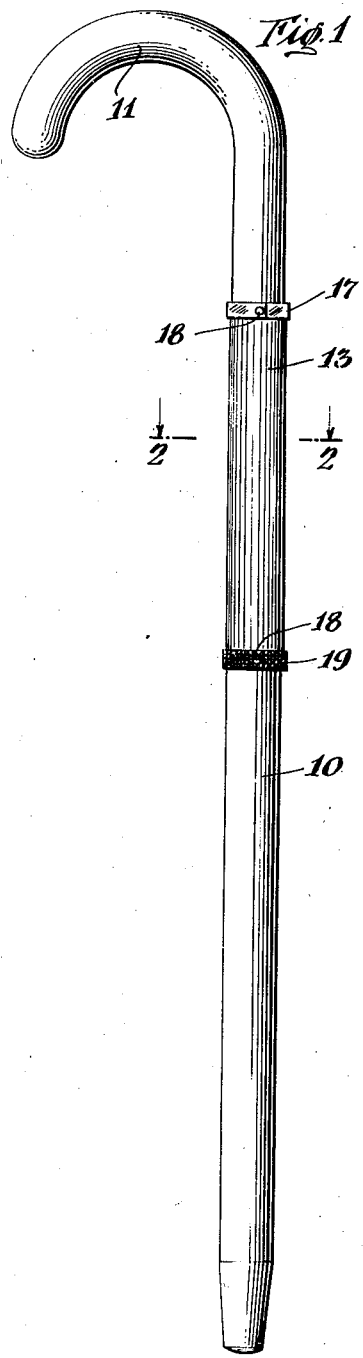
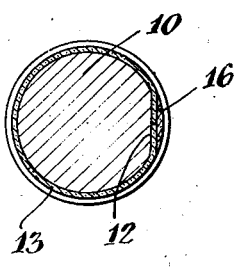
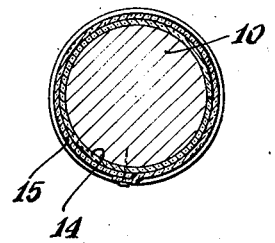
INVENTOR
Henry R. Lounsbery
BY
ATTORNEYS Patented Jan. 6, 1942

2,269,029

UNITED STATES PATENT OFFICE 2,269,029

CANE

Henry R. Lounsbery, Noroton, Conn.

Application June 30, 1939, Serial No. 282,136

3 Claims. (Cl. 88—78)

This invention relates to a structurally and functionally improved walking stick or cane, capable of use in an ordinary manner, and also serving as a warning signal.

It is an object of the invention to furnish a unit of this character which will afford adequate protection for a pedestrian carrying the same, in that it will serve to give warning to approaching motorists that a person or obstruction is upon the road or adjacent the same.

A further object of the invention is that of furnishing a device of this type which will function automatically and without requiring any conscious effort on the part of its user in order to be effective.

An additional object is that of providing a cane by means of which the foregoing objects may be achieved and the structure of which will be such that it may largely be manufactured by quantity production methods and with a minimum of skilled labor, to provide a unit capable of being sold at a nominal figure and functioning over long periods of time with freedom from all difficulties.

With these and other objects in mind, reference is had to the attached sheet of drawings illustrating practical embodiments of the invention, and in which Fig. 1 is a side elevation of a cane embodying my invention;

Fig. 2 is a transverse sectional view taken along the lines 2—2 in the direction of the arrows as indicated in Fig. 1; and Fig. 3 is a view similar to Fig. 2 but showing a slightly alternative form of construction.

In these several figures, the numeral 10 indicates the body or shank of the cane, which, as shown, may be formed with a handle 11. This element may be constructed of any desired material and is preferably of one piece. It is obvious that it may be employed in a conventional manner as a cane or walking stick.

As shown in Fig. 2, the shank or body 10 of the cane may be formed with one or more flat surfaces 12, the purpose of which will be hereinafter emphasized. If only a single flattened surface is provided, it is preferred that such surface extend along the rear edge or surface of the cane. Encircling the cane is a layer or sleeve 13 of reflective material. This may be in the form of metallized paper or cloth or, as shown in Fig. 3, may include an inner layer 14 of reflective material enclosed by a layer 15 of transparent material. The latter may be colored so that, for example, a red ray will be reflected from the surface of material 14. Likewise, it will be understood that the sleeve or layer 13 may embody any desired color and that the overlapping exposed edge portions thereof may be covered by a transparent tape 16 which may be gummed so as to maintain the sleeve configuration of element 13.

As shown, the body or shank 10 of the cane is not reduced adjacent the point to which the sleeve is applied, and for the purposes of illustration the diameter of the latter has been slightly exaggerated. It is apparent that the diameter of the sleeve may be equal to the diameter of shank 10 by reducing such shank adjacent the point of sleeve mounting. However, due to the thinness of layer 13, this may be dispensed with.

To retain the sleeve in position, it is preferred to employ clamping bands 17 which may simply include rings having their ends overlapped, and connected by rivets 18. Likewise, as shown, one or both of the bands may be formed with indentations or surfaces 19 extending angularly with respect to each other so as to provide throughout the zone of the band a reflective factor of maximum efficiency.

After the sleeve has been mounted, it is preferred that layers of finishing lacquer be applied to the entire unit. This will obviously serve to protect all of the parts and preserve them, and especially the metal or metallized surface of the sleeve.

It is obvious that with a unit of this character, a pedestrian walking along a highway and in the dark will receive adequate protection in that motorists will be warned of his presence. More particularly, the headlights of an automobile approaching from any direction will be reflected from the surface of sleeve 13 so that the driver will be cognizant of the existence of an object or person as he approaches the same. More particularly, the head lights of the approaching car will be reflected back in the form of a flaring beam. This in itself will attract the attention of the driver. However, his attention will still further be attracted by the fact that the cane in the hands of the pedestrian will have movement with respect to the head lights. As a consequence of the irregularities which will inevitably exist in the surface of the reflecting layer, the reflective effect will be enhanced in a manner such that the attention of the driver of the approaching vehicle will be arrested. If the cane embodies a plurality of flat surfaces, the effect of the intensity of the reflected light beam is increased and it becomes apparent that if only a single flattened surface is employed, as in Fig.

2, that this surface should exist along the rear edge of the cane body. This is because with the cane gripped in the usual manner, this surface will be facing rearwardly of the path of travel of the pedestrian. With frontwardly approaching vehicles, he will unconsciously observe whether they are giving effect to the warning indication or signal which has been provided. This, however, will usually not be the case with vehicles approaching from the rear, and therefore a warning signal or reflection of maximum intensity should be provided to safeguard the pedestrian in connection with such vehicles. This is achieved by the construction proposed.

Thus, among others, the several objects of the invention as specifically afore noted are achieved. Obviously numerous changes in construction and rearrangements of the parts might be resorted to without departing from the spirit of the invention as defined by the claims.

I claim:

1. As an article of manufacture, a cane including a shank portion and a sleeve of material of substantial length encircling said shank portion adjacent its upper end, said sleeve presenting an uninterrupted reflective surface rigid and substantially flush with respect to the cane shank and whereby a source of illumination directed towards said cane will be visible in the form of a flaring reflection, and securing means adjacent the upper and lower ends of said sleeve and constricted around said shank to retain said sleeve against movement with respect to said shank.

2. As an article of manufacture, a cane including a shank portion and a sleeve of material of substantial length encircling said shank portion, said sleeve presenting an uninterrupted reflective surface rigid and substantially flush with respect to the cane shank and whereby a source of illumination directed towards said cane will be visible in the form of a flaring reflection, a head secured to said shank and to define forward, side and rear portions of the latter, at least the rear portion of said shank at points underlying said sleeve having a configuration different from that of other portions of said shank, and said reflective layer conforming to said different configuration whereby the reflective effect of light rays emanating from a point to the rear of said cane and towards the same will be modified.

3. As an article of manufacture, a cane including a shank portion and a sleeve of material of substantial length encircling said shank portion, said sleeve presenting an uninterrupted reflective surface rigid and substantially flush with respect to the cane shank and whereby a source of illumination directed towards said cane will be visible in the form of a flaring reflection, and securing means adjacent the upper and lower ends of said sleeve and constricted around said shank to retain said sleeve against movement with respect to said shank, said securing means presenting surfaces having reflective characteristics different from those of said sleeve.

HENRY R. LOUNSBERY.